United States Patent [19]
Fraser

[11] Patent Number: 5,894,476
[45] Date of Patent: Apr. 13, 1999

[54] MINIMUM-PIN ATM INTERFACE WITH FLOW CONTROL

[75] Inventor: Alexander Gibson Fraser, Bernardsville, N.J.

[73] Assignee: AT&T Corp, Middletown, N.J.

[21] Appl. No.: 08/696,428

[22] Filed: Aug. 13, 1996

[51] Int. Cl.$^6$ .................. H04L 12/56; H04L 29/10
[52] U.S. Cl. .................. 370/395; 370/229; 370/438; 395/200.62; 395/200.67
[58] Field of Search .................. 370/229, 230, 370/235, 395, 419, 438, 439, 463; 395/200.3, 200.55, 200.62, 200.63, 200.67

[56] References Cited

U.S. PATENT DOCUMENTS

| | | | |
|---|---|---|---|
| 5,485,456 | 1/1996 | Shtayer et al. | 370/60 |
| 5,495,482 | 2/1996 | White et al. | 370/419 |
| 5,524,112 | 6/1996 | Azuma et al. | 370/419 |
| 5,568,486 | 10/1996 | Huscroft et al. | 370/395 |
| 5,644,593 | 7/1997 | Bailey et al. | 375/222 |

FOREIGN PATENT DOCUMENTS 0 697 664 A1  2/1996  European Pat. Off. .

OTHER PUBLICATIONS

Pierre Langlois, "Making the Most of ATM with UTOPIA," *Telecommunications*, (Int. Ed.) (USA), Telecommunications (Int. Ed.), Aug. 1995, Horizon House Publications, USA, vol. 29, No. 8, ISSN 0040-2494, pp. 31-32.

"UTOPIA, An ATM-PHY Interface Specification", Level 1, Version 2.01, Mar. 21, 1994, 1994 The ATM Forum, pp. thru 15.

"UTOPIA, An ATM-PHY Interface Specification", Level 2, Version 0.7, Feb. 5, 1995, 1994 The ATM Forum, pp. thru 38.

*Primary Examiner*—Hassan Kizou

[57] ABSTRACT

A symmetrical low-cost high-density interface for ATM devices. The interface can connect any device which transmits ATM cells to any device which receives ATM cells. The signals of the interface include two control signals and four, eight, sixteen, or thirty-two data signals. The control signals are SOC, which is sent from a transmitter to a receiver and indicates the start of an ATM cell, and STRB, which determines when the transmitter sends SOC and data signals and when the receiver samples SOC and the data signals. STRB is sent under control of the receiver, and the receiver can thus use STRB to control the rate at which the receiver receives cells or portions thereof from the transmitter.

21 Claims, 2 Drawing Sheets

MINIMUM-PIN ATM INTERFACE WITH FLOW CONTROL

FIELD OF THE INVENTION

This invention relates generally to the field of physical interfaces for transferring fixed-length cells and more particularly to minimal physical interfaces for transferring ATM cells.

BACKGROUND OF THE INVENTION

ATM cells are used to transfer data in high-speed asynchronous transfer mode (ATM) networks. The cells are described in Martin DePrycker, *Asynchronous Transfer Mode: Solution for Broadband ISDN*, Ellis Harwood Publishers, 2. ed., 1993. Standard ATM cells are 53 bytes in length. Each cell consists of a 48-byte body which contains the cell's data and a 5-byte header, which contains information used by the network to route the cell and by devices receiving the cell to interpret the cell. Cells are used both to carry control information for ATM networks and attached devices and to carry data between the attached devices.

A current problem in the design of ATM networks is the lack of low-cost, high-density ATM interfaces. Ultimately, ATM networks will directly provide ATM cells to and receive cells from low-cost consumer devices comparable to today's telephones, VCRs, CD players, or even smoke detectors. If ATM networks are to reach their full potential, simple, low-cost interfaces for transmitting and receiving ATM cells must be provided for devices such as those listed above. Additionally, ATM devices such as ATM switches require interfaces with a minimal number of pins to achieve high port densities.

A currently-popular example of a simple ATM interface is the UTOPIA interface described in UTOPIA, an ATM-PHY Interface Specification, Level 1, Version 2.01, The ATM Forum, Mar. 21, 1994. The interface is between a device at the ATM layer and a device at the physical (PHY) layer and has two parts: a transmit interface for transferring cells from the ATM layer to the PHY layer and a receive interface for transferring cells from the PHY layer to the ATM layer. Both interfaces require 8 lines to carry data signals and four lines to carry control signals. The transmit interface may additionally include two optional control lines. In the transmit interface, the four required control signals are the following:

TxSOC: Start of cell. Active high signal asserted by the ATM layer when the data lines contain the first valid byte of an ATM cell.

TzEnb*: Enable. Active low signal asserted by the ATM layer during cycles when the data lines contain valid cell data.

TxFull*/TxCalv: Full/cell available. For byte-level flow control, Txfull* is an active low signal from PHY to ATM layer, asserted by the PHY layer to indicate that a maximum of four more transmit data writes will be accepted. For cell-level flow control, TxClav is an active high signal from PHY to ATM layer, asserted by the PHY layer to indicate it can accept the transfer of a complete cell.

TxClk: data transfer/synchronization clock provided by the ATM layer to the PHY layer for synchronizing transfers on TxData.

UTOPIA has a number of disadvantages which limit its use in low-cost devices or devices with high port densities. The first disadvantage is that a minimum of twelve bus lines are required, 8 for data and four for control signals. A second disadvantage is the complexity of the control signals, which include three flow control signals and a clock signal. A third disadvantage is that the UTOPIA interface is not symmetrical, that is, a device at the ATM layer must send to and receive from a device at the PHY layer, and cannot send to and receive from another device in the ATM layer. One consequence of this fact is that devices at the ATM layer cannot be directly connected to each other.

It is an object of the present invention to provide an ATM interface which is simple enough that switches using the interface can have high port densities and that low-cost devices can use the interface.

SUMMARY OF THE INVENTION

The object is attained with a symmetrical ATM interface for transferring ATM cells from a transmitting device to a receiving device. The interface can be used to interface any transmitter using the interface with any receiver using the interface. A minimal version of the interface has six signals: four for data and two for control. The control signals include a start-of-cell (SOC) signal from the transmitter to the receiver indicating that the transmitter will begin sending a cell in the next cycle and a strobe signal (STRB) which is received by the transmitter at a rate that is controlled by the receiver. The transmitter changes the state of the data signals only in response to the STRB signal. The STRB signal thus permits the receiver to control the flow of cell contents from the sender. In another aspect of the invention, STRB controls the SOC signal in the same fashion that it controls the data signals, and consequently the receiver can control the flow of cells as well as of cell contents.

BRIEF DESCRIPTION OF THE DRAWING

For a more complete understanding of the present invention and the advantages thereof, reference is now made to the following description taken in conjunction with the accompanying drawings in which like reference numbers indicate like features and wherein.

In the reference number for in the figures, the rightmost two digits are the number of an item in a figure and the remaining digits are the number of the figure where the item first appears. Thus, item 201 first appears in FIG. 2.

DETAILED DESCRIPTION

The following detailed description begins with an introduction to the ATM Data Path Interface (hereinafter "DPI"), defines the signals for a DPI, then provides a functional description of the operation of the interface, and finally defines the behavior of DPI transmitters and receivers.

Introduction

The DPI defines a scaleable symmetric interface for the transfer of ATM cells. The DPI minimizes the number of required signal pins and thus encourages the development of low cost ATM devices as well as ATM devices that support a large number of ATM interfaces, such as switches. This allows the development of low cost VLSI circuits for ATM in both end systems and switches by using packages with fewer pins and smaller footprints, or with higher port densities.

The DPI supports a wide range of operating speeds, from sub Megabit per second rates to 622 Megabits per second and higher. This is accomplished by adjusting the DPI operating clock rate and data path port widths. DPI supports four data path port widths: a four bit data path (DPI-4), an eight bit data path (DPI-8), a sixteen bit data path (DPI-16), and a 32-bit data path (DPI-32). A DPI implementation may support multiple port widths.

The symmetric nature of the DPI allows it to be used as a general chip level interconnect for the transfer of ATM cells. For example, in addition to being used between PHY layer and ATM layer devices, it can also be used between a pair of ATM layer devices inside a switch or between a pair of cell handling devices on a multimedia host adapter. Unlike other ATM interfaces, there is no difference in the DPI protocol based on direction. Any DPI transmitter will interface to any compatible width DPI receiver. The interface:

Minimizes the number of required pins for low-cost or high port density applications (a 155 Mbits/s unidirectional interface requires only 6 pins).

is symmetric, allowing any DPI transmitter to communicate with any compatible width DPI receiver.

Provides cell level (inter-cell) flow control to both the transmitter and receiver.

Provides intra-cell flow control to the receiver (i.e., the receiver controls the rate at which data quantities are transferred).

Supports a wide range of operating speeds, from sub Megabit per second rates to 622 Megabits per second and higher.

Figure 1:
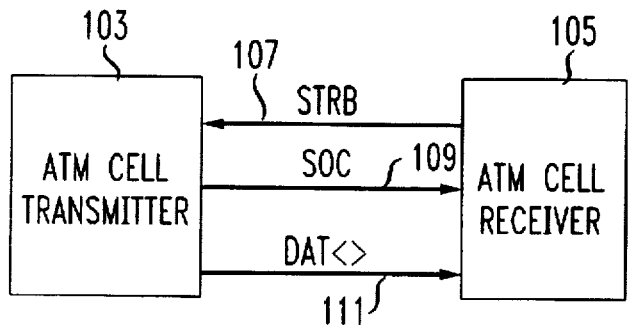
FIG. 1 is a block diagram of the interface of the invention.

Signals: FIG. 1

FIG. 1 shows an ATM cell transmitter 103 and an ATM cell receiver 105 which employ the DPI interface. The interface has two pins for control signals, namely STRB 107 and SOC 109, and varying numbers of pins for data signals DATA<> 111. The signals are the following:

STRB: Strobe. This signal is driven by the receiver and monitored by the transmitter. A rising edge on this signal indicates that receiver has sampled the state of the SOC and DAT< >: signals and that the transmitter can transition these signals to their next state.

SOC: Start Of Cell. This active high signal is driven by the transmitter and monitored by the receiver. It is asserted by the transmitter on the rising edge of STRB to indicate to the receiver that the transmitter will begin transfer of a new cell on the next rising edge of STRB.

DAT< >: Data. This bus contains ATM cell data and is driven by the transmitter and monitored by the receiver. As explained below, the width of this bus depends on the type of DPI interface.

Functional Description of the Interface: FIGS. 1–5

A DPI interface is classified as either a transmitter or receiver. A transmitter is a source of ATM cells while a receiver is a sink for ATM cells. As shown in FIG. 1, a transmitter DPI 103 connects directly to a receiver DPI 105. A device may contain any number of DPI transmitters and receivers. The behavior of DPI is solely determined by whether it is a transmitter 103 or receiver 105.

STRB 107 is driven by the receiver to the transmitter. The receiver generates a pulse on this signal when it is ready to accept new states on the lines that carry SOC 109 and DAT<> 111d. Thus, STRB 107 can be considered as a clock which may be inhibited or stretched by the receiver as form of flow control. The variable time interval between two rising edges of STRB 107 is referred to herein as a clock period.

Receiver 105 samples the state of SOC 109 and DAT< >111 on the rising edge of STRB 107. This rising edge also instructs transmitter 103 to advance the state of SOC 109 and DAT< >111. SOC 109 is driven high by transmitter 103 for one clock period to indicate the start of a new cell. This instructs receiver 105 that the first data quantity associated with a new cell will be presented on DAT< >111 during the next clock period.

Figure 2:
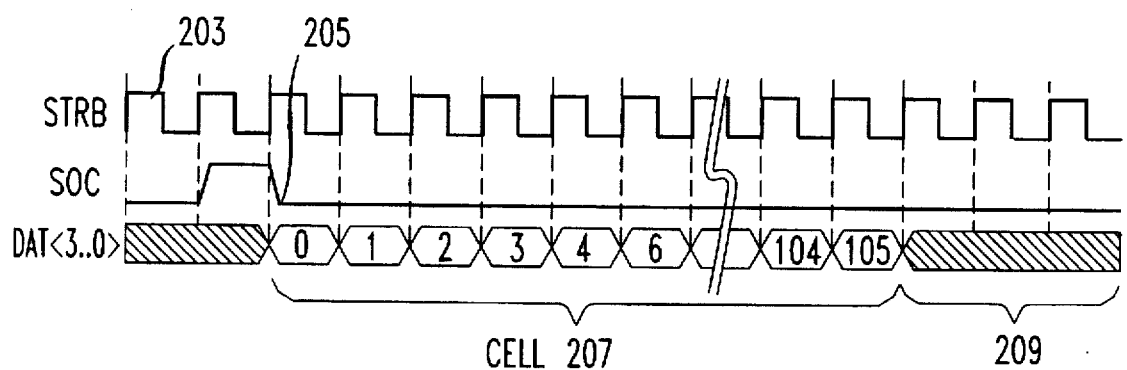
FIG. 2 is a first timing diagram showing operation of the interface.

FIG. 2 illustrates a mode of operation 201 of a DPI-4 interface in which STRB 107 runs at a constant rate 203. In DPI-4, there are only four pins for data. Thus, a complete 53-byte ATM cell 207 requires the transfer of 106 4-bit data quantities on DAT< >bus 111. In FIG. 2, these quantities are numbered 0 through 105. In this example a single ATM cell 207 is transferred. The receiver continues to generate STRB pulses after word 105 indicating that it is ready to accept new cell data. However, since the transmitter has no new cell data, SOC 109 is not asserted and DAT< >bus 111 contains invalid data 209.

Figure 3:
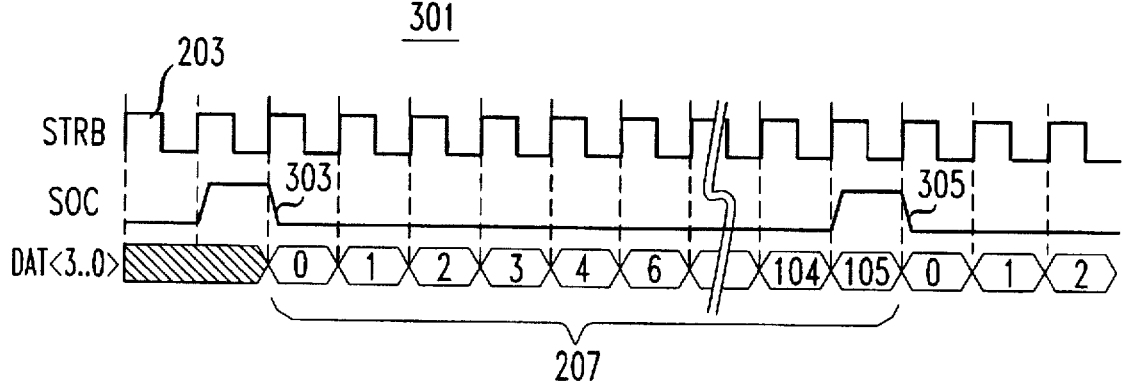
FIG. 3 is a second timing diagram showing operation of the interface.

FIG. 3 illustrates the transfer of back to back cells 301. The first cell transfer begins as in the previous example, one clock period after SOC 303 is asserted. However in this case the transmitter asserts SOC 305 during word 105 to indicate that it is ready to begin the transmission of the next cell during the next clock period. By comparing FIG. 2 and FIG. 3, we can see that the transmitter completes the transfer of the first cell and begins the next cell if SOC is asserted any time during or after word 105. If SOC is asserted before word 105, the receiver considers this a short or partial cell.

The previous two examples illustrate cases in which the receiver is generating a fixed period clock 203 on STRB 107. DPI does not require this. STRB 107 need not be continuous, or even conform to a 50—50 duty cycle, since only the rising edge of STRB 107 carries any meaning. A DPI receiver 105 can throttle the transmission of data by the transmitter either on a cell by cell or word by word basis by controlling the generation of rising edges on STRB 107. This allows a DPI receiver to be designed without any internal cell buffering since a receiver 105 can read a data word from transmitter 103 when a new word is required for output on the transmission line.

Figure 4:
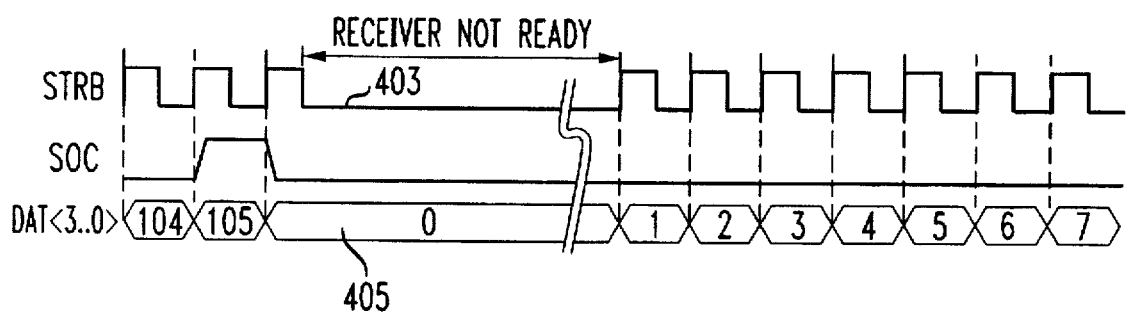
FIG. 4 is a third timing diagram showing operation of the interface.

FIG. 4 illustrates the case 401 where DPI receiver uses STRB 107 for intra-cell flow control. As shown at 403 and 405, word 0 of the cell remains on DAT<> bus 111 until receiver 105 generates the next rising edge on STRB 107. This mechanism allows receiver 105 to take advantage of buffering in a DPI transmitter 103. Receiver 105 uses STRB 107 to provide back pressure to the buffers on a transmitter 103, for example,(e.g., a host adapter or a line card of a switch).

Figure 5:
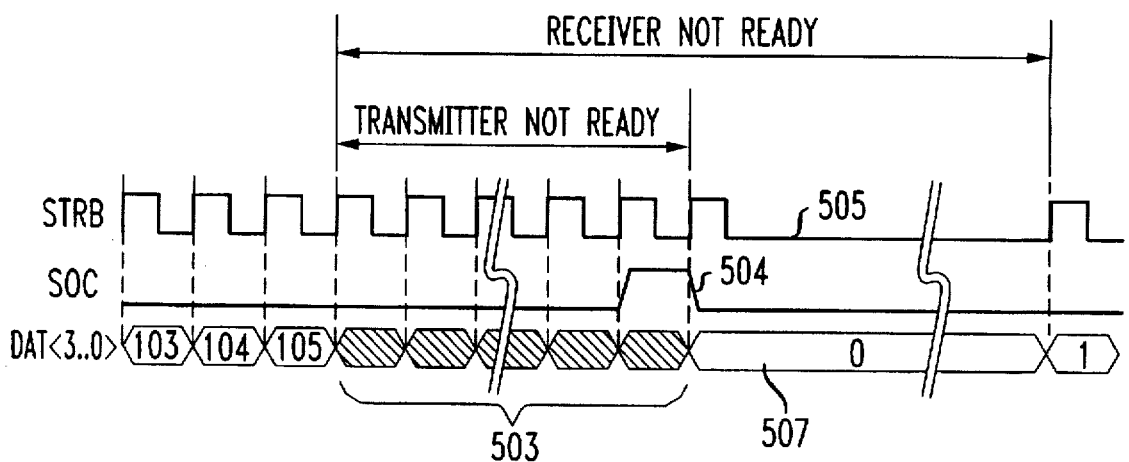
FIG. 5 is a fourth timing diagram showing operation of the interface.

As mentioned above, transmitter 103 also requires a rising edge on STRB 107 to change the state of SOC 505. This feature of the interface can be used for inter-cell flow control. FIG. 5 illustrates how this may be done. In this example 501, although receiver 105 is not ready to accept a new cell it keeps generating rising edges on STRB 107. Since STRB 107 continues to have rising edges, transmitter 103 can change the state of SOC 109 at 504 and can place the first data quantity of the ATM cell on DAT<> 111 at 507. However, receiver 105 is not ready, so it inhibits STRB 107 until it is ready to accept new data. By thus permitting transmitter 103 to assert SOC 109 before receiver 105 is ready, a one-clock period overhead may be eliminated.

Since it is receiver 105 that determines the rate at which transmitter 103 places data on DATE<> bus 111, once transmitter 103 has generated SOC 109, it must be prepared to deliver data words at the maximum rate at which receiver 105 can request. In general, a DPI transmitter 103 must contain an internal buffer to decouple the rate at which the buffer is filled (by the transmitter) and emptied (by the receiver)

Transmitter 103 Behavior

This section describes the behavior of a DPI transmitter 103.

A rising edge on STRB 107 indicates to transmitter 103 that it is to present the new state of SOC 109 and DAT<>111.

Transmitter asserts SOC 109 for one clock period to indicate to receiver 105 that it has a complete ATM cell ready for transmission.

For back to back cell transmission this occurs in the clock period during which the transfer of the last data quantity of the previous cell takes place.

For non back-to-back cell transmission this occurs in any clock period after the clock period during which the transfer of the last data quantity of the previous cell takes place.

Transmitter 103 may not assert SOC 109 earlier than the clock period during which the transfer of the last data quantity of the previous cell takes place. Doing so will result in receiver 105 observing a "short-cell."

Once transmitter 103 asserts SOC 109, indicating that a cell is ready, it must transmit a new cell data quantity on each rising edge of SOC until the entire cell is transmitted (106 clock periods for DPI-4, 53 clock periods for DPI-8, 27 clock periods for DPI-16, and 14 clock periods for DPI-32).

Receiver Behavior

This section describes the behavior of a DPI receiver 103.

The receiver generates rising edges on the STRB signal to delimit clock periods. The time between rising edges may be any time greater than or equal to the specified minimum.

The receiver generates a rising edge on the STRB signal only when it is ready to accept a new state on SOC and DAT<>.

The receiver samples the state of SOC and DAT<>on each rising edge of STRB.

When SOC is sampled high by the receiver this indicates that the transmitter will transfer the first data quantity of a new cell during the next clock period.

A cell is considered as transferred from the transmitter to the receiver on the rising edge following the one on which the last data quantity is sampled.

The receiver may detect a "short cell" error condition by observing the assertion of SOC before sampling the last data quantity.

All cell data following the 53rd octet is discarded by the receiver.

Conclusion

The foregoing Detailed Description has shown those skilled in the arts to which the invention pertains how to make and use a symmetrical ATM cell interface which has only two control lines but which nevertheless permits the receiver to determine the rate at which it receives cells or cell contents. The Detailed Description has also disclosed the best mode presently known to the inventor of making and using the invention. It will however be immediately apparent to those skilled in the arts to which the invention pertains that many other embodiments which incorporate the principles of the invention are possible. For example, the preferred embodiment is used for ATM cells, but the principles of the invention may be applied in any situation where the length of the cell is known by the receiver prior to the cell being sent to the receiver. Furthermore, the STRB, SOC, and DATA<> signals may take forms that are different from those disclosed herein and may still have relationships to each other that embody the principles disclosed herein. For example, STRB may be provided by a clock which is external to the receiver but which can be inhibited by the receiver.

All of the foregoing being the case, the Detailed Description is to be understood as being in all respects exemplary and not restrictive, and the scope of the invention is to be determined solely from the appended claims as interpreted with the maximum breadth permissible under the patent laws.

What is claimed is:

1. An interface for transferring a fixed-length cell from a transmitter to a receiver, the interface being made up of transfer means which operate in parallel and the interface comprising:

strobe signal transfer means for transferring a strobe signal to the transmitter, the strobe signal being transferred at a rate that is under control of the receiver, and independent of the transmitter, start of cell signal transfer means for transferring a start of cell signal from the transmitter to the receiver; and at least one data signal transfer means for transferring data signals representing a portion of the cell from the transmitter to the receiver, and wherein the start of cell signal takes effect in response to the strobe signal, switching from an inactive state to an active state and returning to said inactive state prior to appearance of a first data signal of a cell marked by said start of cell signal, whereby the receiver controls the rate at which the transmitter transfers the cell to the receiver.

2. The interface set forth in claim 1 wherein:

the data signals representing a given portion of the cell take effect in response to the strobe signal, whereby the receiver further controls the rate at which the transmitter transfers the portions of the cell to the receiver.

3. An interface for transferring a fixed-length cell from a transmitter to a receiver, the interface being made up of transfer means which operate in parallel and the interface comprising:

strobe signal transfer means for transferring a strobe signal to the transmitter, the strobe signal being transferred at a rate that is under control of the receiver;

start of cell signal transfer means for transferring a start of cell signal from the transmitter to the receiver; and at least one data signal transfer means for transferring data signals representing a portion of the cell from the transmitter to the receiver, wherein the start of cell signal takes effect in response to the strobe signal, whereby the receiver controls the rate at which the transmitter transfers the cell to the receiver, and wherein the data signals representing the first portion of the cell take effect in response to a next following strobe signal following the strobe signal that caused the start of cell signal to take effect.

4. The interface set forth in claim 3 wherein:

the data signals representing a last portion of the cell to be transmitted take effect in response to the strobe signal that caused the start of cell signal to take effect.

5. The interface set forth in claim 4 wherein:

the receiver keeps track of the number of portions of the cell that have been transferred; and when the start of cell signal takes effect before the full number of portions have been transferred, the receiver provides an indication that a short cell was transferred.

6. The interface set forth in claim 4 wherein:

the receiver keeps track of the number of portions of the cell that have been transferred; and the receiver does not receive portions beyond the full number thereof.

7. The interface set forth in claim 6 wherein:

the receiver keeps track of the number of portions of the cell that have been transferred; and when the start of cell signal takes effect before the last portion of the full number of portions is being transferred, the receiver provides an indication that a short cell was transferred and the receiver further does not receive portions beyond the full number thereof.

8. The interface set forth in claim 1 wherein:

the strobe signal is an edge;

the start of cell signal is a first state; and the transmitter asserts the first state in response to the edge.

9. The interface set forth in claim 8 wherein:

the receiver samples the first state in response to the edge.

10. The interface set forth in any of claims 1 through 9 wherein:

the strobe signal transfer means transfers the strobe signal from the receiver.

11. An improved receiver for receiving a fixed-length cell, the receiver having the improvement comprising:

the interface set forth in any of claims 1 through 9.

12. An improved transmitter for transmitting a fixed-length cell, the transmitter having the improvement comprising:

the interface set forth in any of claims 1 through 9.

13. The interface set forth in any of claims 2 through 7 wherein:

the strobe signal is an edge;

the start of cell signal is a first state;

the signals representing the portion are a set of states; and the transmitter asserts the first state and the set of states in response to the edge.

14. The interface set forth in claim 13 wherein:

the receiver samples the first state and the set of states in response to the edge.

15. A method of transferring a fixed-length cell from a transmitter to a receiver on an interface made up of transfer means which operate in parallel, the interface including strobe signal transfer means for transferring a strobe signal from the transmitter, the strobe signal being transferred at a rate that is under control of the receiver, and independently of the transmitter, start of cell signal transfer means for transferring a start of cell signal from the transmitter to the receiver, and at least one data signal transfer means for transferring data signals representing a portion of the cell from the transmitter to the receiver, wherein the start of cell signal and the data signals representing a given portion of the cell take effect in response to the strobe signal, switching from an inactive state to an active state and returning to said inactive state prior to appearance of a first data signal of a cell marked by said start of cell signal, and the method comprising the steps performed in the transmitter of:

determining that the next portion of the cell is the last portion thereof; and asserting the start of cell signal and the data signals for the next portion of the cell in response to the next strobe signal.

16. A data storage device which is characterized in that:

the data storage device contains code which, when executed by a processor in the transmitter, causes the processor to perform the steps set forth in claim 15.

17. A method of transferring a fixed-length cell from a transmitter to a receiver on an interface made up of transfer means which operate in parallel, the interface including strobe signal transfer means for transferring a strobe signal to the transmitter, the strobe signal being transferred at a rate that is under control of the receiver, and independently of the transmitter, start of cell signal transfer means for transferring a start of cell signal from the transmitter to the receiver, and at least one data signal transfer means for transferring data signals representing a portion of the cell from the transmitter to the receiver, wherein the start of cell signal and the data signals representing a given portion of the cell take effect in response to the strobe signal, switching from an inactive state to an active state and returning to said inactive state prior to appearance of a first data signal of a cell marked by said start of cell signal, and the method comprising the steps performed in the receiver of:

determining in the receiver that the receiver cannot receive further cell contents, and causing the strobe signal not to be provided until the receiver can again receive further cell contents.

18. The method set forth in claim 17 further comprising the steps performed in the receiver of:

causing the strobe signal to continue to be provided after determining that the receiver cannot presently receive a further cell;

receiving a start of cell signal in the receiver; and ceasing to provide the strobe signal upon receipt of the start of cell signal.

19. The method set forth in claim 17 or claim 18 further comprising the steps of:

counting the number of portions of the cell that have been transferred to the receiver; and retaining an indication of a short cell in the receiver when a start of cell signal takes effect before the last portion of the fill number of portions is being transferred.

20. A data storage device which is characterized in that:

the data storage device contains code which, when executed by a processor in the receiver, causes the processor to perform the steps set forth in claim 19.

21. A data storage device which is characterized in that:

the data storage device contains code which, when executed by a processor in the receiver, causes the processor to perform the steps set forth in claim 17 or claim 18.

* * * * *